(12) United States Patent
Ravikumar et al.

(10) Patent No.: US 7,974,934 B2
(45) Date of Patent: Jul. 5, 2011

(54) METHOD FOR SEGMENTING WEBPAGES BY PARSING WEBPAGES INTO DOCUMENT OBJECT MODULES (DOMS) AND CREATING WEIGHTED GRAPHS

(75) Inventors: Shanmugasundaram Ravikumar, Berkeley, CA (US); Deepayan Chakrabarti, Mountain View, CA (US); Kunal Punera, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 757 days.

(21) Appl. No.: 12/058,622

(22) Filed: Mar. 28, 2008

(65) Prior Publication Data

US 2009/0248608 A1 Oct. 1, 2009

(51) Int. Cl.
*G06F 11/00* (2006.01)
(52) U.S. Cl. .......................................... 706/12
(58) Field of Classification Search ............... 706/12, 706/45–48, 62; 707/706–708
See application file for complete search history.

(56) References Cited

U.S. PATENT DOCUMENTS

2009/0248608 A1* 10/2009 Ravikumar et al. ............. 706/55

OTHER PUBLICATIONS

Nir Ailon, Department of Computer Science, Princeton University, Princeton, NJ, Moses Charikar, Department of Computer Science, Princeton University, Princeton, NJ, Alantha Newman, Department of Computer Science, RWTH, Aachen, Germany, "Aggregating Inconsistent Information: Ranking and Clustering", STOC '05, May 22-24, 2005, Baltimore, Maryland, USA, Copyright 2005, ACM 1-58113-960-8/05/0005; pp. 684-693.

Shumeet Baluja, Google, Inc., 1600 Amphitheatre Parkway, Mountain View, CA, "Browsing on Small Screens: Recasting Web-Page Segmentation into an Efficient Machine Learning Framework", Copyright is held by the International World Wide Web Conference Committee (IW3C2), WWW 2006, May 23-26, 2006, Edinburgh, Scotland, ACM 1-59593-323-9/06/0005; 10 pages not numbered on article.

Krishna Bharat, Compaq SRC, 130 Lytton Ave., Palo Alto, CA, Andrei Broder, Alta Vista Company, 1825 S. Grant St., San Mateo, CA, Jeffrey Dean, Google, Inc., 165 University Ave., Palo Alto, CA, ; Monika R. Henzinger, Compaq SRC 130 Lytton Ave., Palo Alto, CA, "A Comparison of Techniques to Find Mirrored Hosts on the WWW", Aug. 25, 1999. This work was presented at the Workshop on Organizing Web Space at the Fourth ACM Conference on Digital Libraries 1999; pp. 1-19.

Yuri Boykov, Olga Veksler, Ramin Zabih, Computer Science Department, Cornell University, Ithaca, NY, "Fast Approximate Energy Minimization via Graph Cuts", PAMI, 23(11):1222-1239, Nov. 2001; 8 pages not numbered on article.

Andrei Z. Broder, Steven C. Glassman, Mark S. Manasse, Geoffrey Zweig, Systems Research Center, 130 Lytton Avenue, Palo Alto, CA, "Syntactic Clustering of the Web", SRC Technical Note, 1997-015, Jul. 25, 1997, Copyright 1997 Digital Equipment Corporation, WWW6/Computer Networks, 29(8-13):1157-1166, 1997, pp. 1-13.

(Continued)

*Primary Examiner* — David R Vincent
(74) *Attorney, Agent, or Firm* — Hickman Palermo Truong & Becker LLP (57) ABSTRACT

A method of segmenting a webpage into visually and semantically cohesive pieces uses an optimization problem on a weighted graph, where the weights reflect whether two nodes in the webpage's DOM tree should be placed together or apart in the segmentation; the weights are informed by manually labeled data.

15 Claims, 3 Drawing Sheets

OTHER PUBLICATIONS

Deng Cai, Tsinghua University, Beijing, P.R. China, Shipeng Yu, Peking University, Beijing, P.R. China, Ji-Rong Wen and Wei-Ying Ma, Microsoft Research Asia, "Extracting Content Structure for Web Pages based on Visual Representation", In 5th Asia Pacific Web Conference, pp. 406-415, 2003, 12 pages not numbered on article.

Deepayan Chakrabarti, Yahoo! Research, 701 First Ave., Sunnyvale, CA; Ravi Kumar, Yahoo! Research, 701 First Ave., Sunnyvale, CA; Kunal Punera, Dept. of ECE, Univ. Texas at Austin, Austin, TX; "Page-level Template Detection via Isotonic Smoothing", Copyright is held by the International World Wide Web Conference Committee (IW3C2), WWW 2007, May 8-12, 2007, Banff, Alberta, Canada, ACM 978-1-59593-654-7/07/0005, pp. 61-70.

Yu Chen, Xing Xie, Wei-Yang Ma, Hong-Jiang Zhang, Microsoft Research, Asia; "Adapting Web Pages for Small-Screen Devices", Web-page Transformation, Jan.-Feb. 2005, Published by the IEEE Computer Society, 1089-7801/05, Copyright 2005 IEEE, IEEE Internet Computing 9(1):50-56, 2005, pp. 2-8.

David Gibson, IBM Almaden Research Center, 650 Harry Road, San Jose, CA, Kunal Punera, Dept. of Electrical and Computer Engineering, University of Texas at Austin, Austin, TX, Andrew Tomkins, IBM Almaden Research Center, 650 Harry Road, San Jose, CA, "The Volume and Evolution of Web Page Templates", Copyright is held by the International World Wide Web Conference Committee (IW3C2). WWW 2005, May 10-14, 2005, Chiba, Japan, ACM 1-59593-051-5/05/0005. In Proc. 14th WWW (Special interest tracks and posters), 2005, pp. 830-839.

Lawrence Hubert, The University of California, Santa Barbara, CA, Phipps Arabie, University of Illinois at Champaign, "Comparing Partitions", Journal of Classification 2:193-218 (1985), Springer-Verlag New York Inc., pp. 193-218.

Hung-Yu Kao, Department of Computer Science and Information Engineering, National Cheng Kung University, Tainan, Taiwan, ROC, Jan-Ming Ho, Institute of Information Science, Academia Sinica, Taipei, Taiwan, ROC, Ming-Syan Chen, Graduate Institute of Communication Engineering and the Electrical Engineering Department, National Taiwan University, Taipei, Taiwan, ROC, "Wisdom: Web Intrapage Informative Structure Mining Based on Document Object Model", Published online Mar. 17, 2005, IEEECS, Log No. TKDE-0180-0903, 1041-4347/05, Copyright.

Jon Kleinberg, Department of Computer Science, Cornell University, Ithaca, NY, Eva Tardos, Department of Computer Science, Cornell University, Ithaca, NY, "Approximation Algorithms for Classification Problems with Pairwise Relationships: Metric Labeling and Markov Random Fields", Proceedings of the 40th Annual IEEE Symposium on the Foundations of Computer Science, Oct. 1999, J. ACM, 49(5):616-639, 2002, pp. 1-19.

Vladimir Kolmogorov, Computer Science Department, Cornell University, Ithaca, NY, Ramin Zabih, Computer Science Department, Cornell University, Ithaca, NY, "What Energy Functions Can Be Minimized via Graph Cuts?", IEEE Transactions on Pattern Analysis and Machine Intelligence, vol. 26, No. 2, Feb. 2004, PAMI, 26(2):147-159, 2004,0162-8828/04, Copyright 2004 IEEE, Published by the IEEE Computer Society, Reference IEEECS, Log No. 118731, pp. 147-159.

Glenn W. Milligan, Faculty of Management Sciences, Martha C. Cooper, Faculty of Marketing, The Ohio State University, "A Study of the Comparability of External Criteria for Hierarchical Cluster Analysis", Multivariate Behavioral Research, 1986, 21, 441-458, Oct. 1986, pp. 441-458.

Tom Mitchell, Fredkin Professor of AI and Machine Learning Chair, Machine Learning Department, School of Computer Science, Carnegie Mellon University, "Research: Machine Learning, Computer Science, Cognitive Neuroscience", McGraw Hill, 1997, Copyright 1996, Tom M. Mitchell and McGraw Hill, 10 pages.

Alexander Strehl, Joydeep Ghosh, Department of Electrical and Computer Engineering, The University of Texas at Austin, Austin, TX, "Cluster Ensembles—A Knowledge Reuse Framework for Combining Multiple Partitions", Editor: Claire Cardie, Copyright 2002, Alexander Strehl and Joydeep Ghosh, Journal of Machine Learning Research (JMLR), 3:583-617, Dec. 2002, pp. 583-617.

Kilian Q. Weinberger, John Blitzer, Lawrence K. Saul, Department of Computer and Information Science, University of Pennsylvania, Levine Hall, 3330 Walnut Street, Philadelphia, PA, "Distance Metric Learning for Large Margin Nearest Neighbor Classification", In Proc. NIPS 2006, pp. 1473-1480, 2006, 8 pages not numbered on article.

Xinyi Yin, Department of Computer Science, National University of Singapore, Singapore, Wee Sun Lee, Department of Computer Science and Singapore-MIT Alliance, National University of Singapore, Singapore, Copyright is held by the author/owner(s), WWW 2004, May 17-22, 2004, New York, New York, USA, ACM 1-58113-844-X/04/0005, pp. 338-344.

* cited by examiner

FIG. 1

$(s) \longrightarrow (p)$   OR   $(p) \longrightarrow (t)$ $(D_P(\alpha) - D_P(\beta))$   $(D_P(\beta) - D_P(\alpha))$

METHOD FOR SEGMENTING WEBPAGES BY PARSING WEBPAGES INTO DOCUMENT OBJECT MODULES (DOMS) AND CREATING WEIGHTED GRAPHS

BACKGROUND

1. Field of the Invention

Aspects of the present invention relate generally to a method for pulling apart a webpage into visually and semantically cohesive pieces.

2. Description of Related Art

As web usage is increasing, the creation of content is becoming more mature, and its presentation more sophisticated. As is known in the art, presentation involves placing different pieces of information on a webpage—each serving a different purpose—in a manner that appears coherent to users who browse the webpage. These pieces have carefully placed visual and other cues that cause most users to subconsciously segment the browser-rendered page into semantic regions, each with a different purpose, function, and content.

Most of the techniques currently used to attempt webpage segmentations involve simple rule-based heuristics. The heuristics typically utilize several features present on a webpage, including geometry-related features, and apply the rules in a greedy fashion to produce the segments. While a heuristic approach might work well on small sets of pages and for the specific tasks for which it was designed, it has several problems.

For example, it is hard to automatically adapt the heuristics to keep abreast of the inherently dynamic nature of presentation styles and content types on the web. Furthermore, combining multiple heuristics that work well on different types of pages into a single all-in-one heuristic is a manually intensive trial-and-error effort. Moreover, since heuristics are inherently greedy, the solutions they produce tend to be local minima.

Thus, it would be desirable to use a more principled, generalized approach to webpage segmentation.

SUMMARY

In light of the foregoing, it is a general object of the present invention to provide a method of automatically segmenting a webpage though a combinatorial optimization framework, that does not require any parameters to be set by implementers of the framework.

DETAILED DESCRIPTION

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of solving the problem of automatic webpage segmentation, based generally on formulating an appropriate optimization problem on weighted graphs. In particular, the problem is cast as a minimization problem on a suitably defined weighted graph, whose nodes generally are the Document Object Model (DOM) tree nodes and where the edge weights generally express the cost of placing the nodes in same/different segments. It will be appreciated that the method used to segment the webpage is not limited to minimizing an objective function on the weighted graph, and that under certain conditions, it may be advantageous to use other, known methods (e.g., a heuristic or rules-based solution) to partition the weighted graph.

As is known in the art, the DOM is a standard object model for representing Hypertext Markup Language (HTML) and eXtensible Markup Language (XML) documents. Most modern web browsers generally support and use the DOM in some capacity to render webpages within the webpage. Further, JavaScript™ requires that the web browser support the DOM in order for the scripting language to dynamically inspect and/or modify the rendered webpage. It will be appreciated by those of skill in the art that the various browsers have varying support for the DOM, and that such variations are not critical to the invention.

Generally, through the DOM, the data is an HTML/XML document, and the data structure used to represent the data is a "tree," with various "nodes." As an example of such a tree, consider a simple HTML document, with various tags containing basic elements needed for its construction. Generally, under the DOM, and as is known in the art, the entire document is a document node, every HTML tag is a [element] node, the text contained in the HTML elements are [text] nodes, every HTML attribute is a [attribute] node, etc., and the tree starts at the document node and continues to branch out until it has reached all text nodes at the lowest level of the tree.

Throughout this disclosure, reference is made to "segment," which denotes a fragment, or fragments, of HTML, which when rendered, may produce a visually continuous and cohesive region on the browser window and may have a unified theme in its content and purpose. Under this broad notion, the following can be termed webpage segments: left navigation menu bar, site-specific banner that might appear at the top, navigation footer, links and abstracts of related webpages, banner and other forms of advertisements scattered throughout a page, copyright notices, terms of service, contact information, etc., and even the content itself, which, depending on how the creator of the webpage chose to organize it, might itself be represented by multiple segments.

Figure 1:
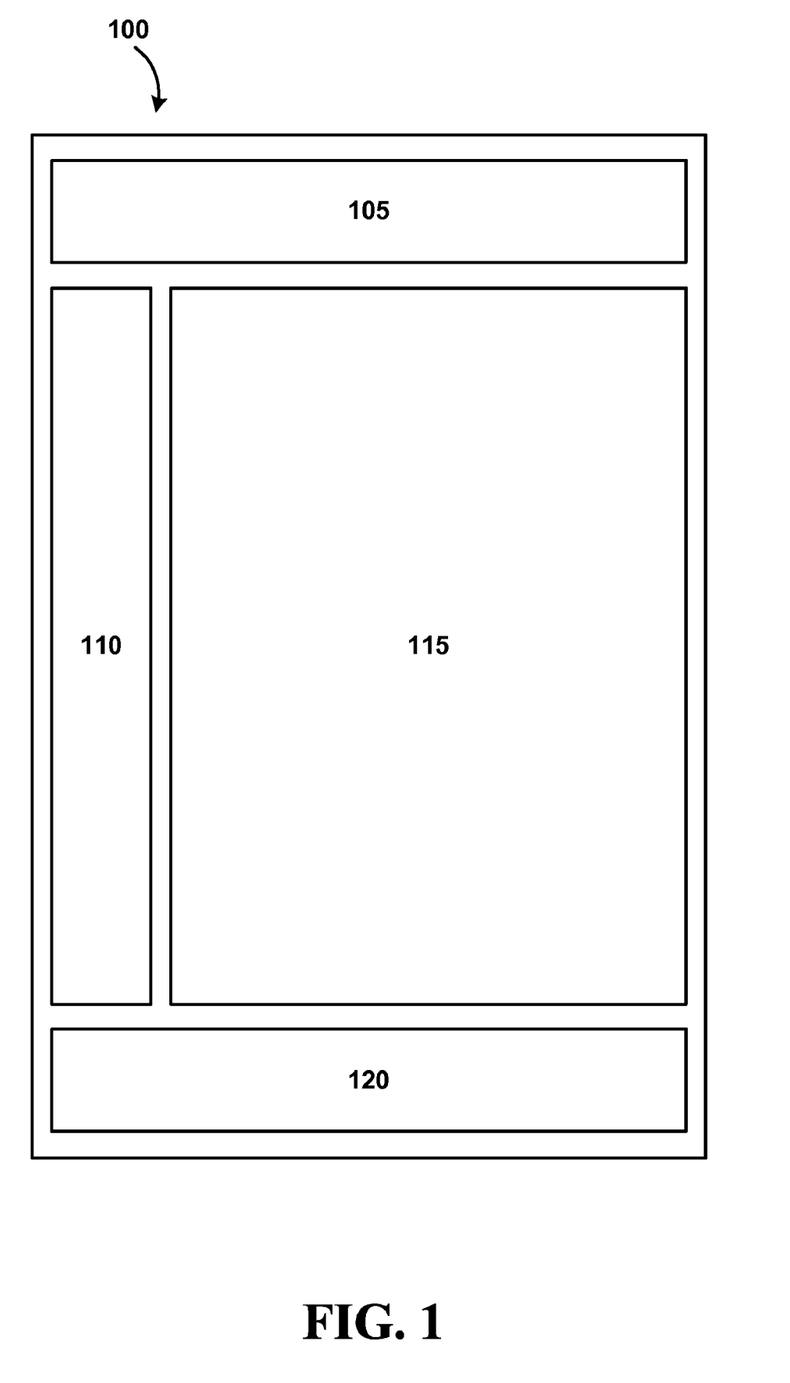
FIG. 1 is an example webpage and its various segments.

An example of a webpage and its various segments is shown in FIG. 1. Webpage 100, when rendered in a browser, contains header 105, navigation menu 110, content section 115, and footer 120, each of which can be thought of as webpage 100's segments.

There are several applications of webpage segmentation, including the demarcation of informative and non-informative content on a webpage, and the ability to discriminate between different types of information. Such applications can be very useful in web ranking and web data-mining applications. As an example, consider a multi-word query whose terms match across different segments in a page; this information can be useful in adjusting the relevance of the page to the query. Similarly, segments appropriately labeled as, for example, informative and non-informative, can improve the precision of data-mining tasks like duplicate detection (as described generally herein). Identification of segments can also play a vital role in displaying webpages on devices with small screens (e.g., PDAs, smartphones, etc.).

The DOM nodes comprising an HTML/XML page can be viewed in at least three independent contexts, each capable of contributing its own piece of information about the webpage (i.e., a "feature" of the webpage). First, each node in the DOM tree represents a subtree that consists of a set of leaf nodes with various stylistic and semantic properties such as headers, colors, font styles, links, etc. Second, each node occupies visual real estate when rendered on a web browser; node layout may provide information on both its semantics (e.g., nodes rendered on the bottom of the page are likely to be less important than those in the center) as well as its relationships to other nodes (e.g., segment boundaries are more likely to occur where neighboring nodes are farther away from each other). Finally, since the same visual layout (i.e., the document as rendered) can be obtained from syntactically different DOM trees, the particular DOM tree structure used by the content creator may imply various semantic relationships among the nodes (e.g., nodes separated by a large distance are more likely to be unrelated, and thus lie across segment boundaries).

The invention combines these features into a single objective function such that the minimization of this function results in an accurate segmentation. The objective function encodes the cost of a particular way of segmenting the DOM nodes. A combinatorial approach to segmentation, as described herein, offers several advantages over a heuristics-based approach, in addition to being somewhat principled. First, it allows for the experimentation of minor variants of the objective function, and thereby allows different families of algorithms to be used. Second, it allows for the fine-tuning of the combination of views; depending on the website or application context, the relative importance of any view can be varied. For example, feature-based segmentation may be more meaningful on pages from sites whose pages generally have strong structural cues such as headers and links to subsections of the webpage. Conversely, visual relationships among nodes may be more useful on free-form pages, such as end-user home pages. Any such domain-specific knowledge can easily be incorporated into the objective function, leaving the algorithm for its minimization effectively unchanged.

For this framework to be algorithmically feasible in web-scale applications, where it must deal with large DOM trees comprising many thousands of nodes, the objective function and the combinatorial formulation have to be chosen carefully. A particularly important question that must be addressed by the function is how to succinctly capture the latent constraints that exist among different subsets of nodes in the DOM tree. Considering each DOM tree node individually may be insufficient to express any form of inter-node relationship, but allowing the objective function to encode relationships among arbitrary subsets of DOM tree nodes is unwieldy and can lead to combinatorial explosion. Therefore, as a tradeoff between expressability and tractability, the invention limits node interactions to two-way (i.e., pairwise) interactions, such that the objective function deals with only quadratically many terms—one for each pair of nodes in the DOM tree—and lends itself to be cast as a clustering problem on an appropriately defined graph.

To represent such a scheme, let N be the set of nodes in the DOM tree, and consider the graph whose node set is N and whose edges have a weight, which corresponds to the cost associated with placing the end points of an edge in different segments. Let L be a set of segments (currently assumed to be distinguishable from one another). Let $D_p:L \to R^{\geq 0}$ represent the cost of assigning a particular segment to a node p, and let $V_{pq}: L \times L \to R^{\geq 0}$ represent the cost of assigning two different segments to the end points of the edge (p,q). Let $S:N \to L$ be the segmentation function that assigns each node $p \in N$ the segment $S(p)$. Given such representations, the cost of a segmentation S can be represented as follows:

$$\sum_{p \in N} D_p(S(p)) + \sum_{p,q \in N} V_{pq}(S(p), S(q)) \qquad (1)$$

Finding a segmentation to minimize this objective is a metric labeling problem that is NP-hard, but has a (log|L|)-approximation algorithm that is based on LP-rounding when $V_{pq}$ is a metric. While this objective is mathematically clean, it is still fairly general, less appealing from a practical point of view, and does not capture the nuances of the segmentation problem. In particular, consider the rendering constraint inherent in the segmentation problem, namely that every pixel on the screen can belong to at most one segment. Such a constraint arises out of the DOM tree structure: the area on the screen occupied by a child node is geometrically contained inside that of its parent node in the DOM tree. Therefore, any segmentation should respect the rendering constraint (i.e., if it places the root of a subtree in a particular segment, then it has to place all the nodes in the entire subtree in the same segment).

The invention described herein covers two methods of using a version of the objective in equation (1) that has a simple combinatorial algorithm which also incorporates the rendering constraint, namely a formulation based on correlation clustering and a formulation based on energy-minimizing graph cuts.

For the correlation clustering formulation, it should first be observed that the actual "names" of the segments do not really matter in segmentation. Given such an observation, various modifications to the objective in equation (1) can be made. First, the segments in the set L can be treated as being indistinguishable from one another. Second, and to prevent trivial solutions because of these modifications, the objective in equation (1) can be changed to:

$$\sum_{\substack{p,q \in leaf(N) \\ S(p) \neq S(q)}} V_{pq} + \sum_{\substack{p,q \in leaf \\ S(p) = S(q)}} (1 - V_{pq}) \qquad (2)$$

The second term in equation (2) penalizes pairs of nodes (p,q) that are better off being in separate segments (i.e., $V_{pq}$ is small), but are placed in the same segment by S. Equation (2) represents a correlation clustering problem, which has a rich body of work, including simple and practical combinatorial approximation algorithms, some of which can approximate equation (2) to within a factor of 2. However, enforcing the rendering constraint in equation (2) is not simple. Heuristically, there are two possible options, the first of which is detailed herein, and the second covered only cursorily. The first is to consider only the leaf nodes of the DOM tree and perform segmentation on them. The problem with this approach is that leaf nodes in the DOM tree are often too small to have reliable or useful features. By construction, they carry very limited information such as plain text, italicized, bold, within an anchor text, etc. This makes the features sparse and noisy, thereby adversely impacting the quality of the segmentation. The second heuristic-based approach is to go ahead with equation (2) on N, but post-process and apply the rendering constraint in a top-down fashion. However, even if a reasonably good solution to equation (2) is found, post-processing may damage its quality in the course of enforcing the rendering constraint.

For the energy-minimizing graph cuts formulation, the objective in equation (1) is retained as the basic objective, but more structure is imposed on the costs $V_{pq}$, which serves two purposes: (1) a combinatorial algorithm for the problem can be obtained, as opposed to solving a linear program; and (2) the factor of approximation will be 2, instead of log|L|.

Within this framework, the rendering constraint is satisfied by creating a special segment ξ—the "invisible" segment—and considering the segmentation S:N→L∪U{ξ}. The invisible segment has two defining properties: (1) only internal nodes of the DOM tree can be assigned the invisible segment; and (2) for any p,q∈N where q is a child of p in the DOM tree, either both p and q must belong to the same segment, or p must belong to the invisible segment (i.e., S(p)=S(q) or S(p)=ξ).

Intuitively, the invisible segment consists of nodes that were not meant to form a coherent visual segment (i.e., they are invisible when the HTML is rendered on screen), but are present to maintain the tree structure of the DOM. Property (2) ensures that if any internal node belongs to the invisible segment, all of it ancestors must be invisible as well. Therefore, by carefully setting $D_p$ and $V_{pq}$ when S(p)=ξ, segmentations can be elicited from the algorithm that follow the DOM tree structure to varying degrees.

The form of the objective function is closely intertwined with the algorithm used to optimize it, and as discussed briefly above, extensions of algorithms based on two approaches are detailed herein, namely correlation clustering and energy-minimizing graph cuts.

The correlation clustering problem starts with a complete weighted graph. The weight $v_{pq} \in [0,1]$ of an edge represents the cost of placing its endpoints p and q in two different segments; similarly, $(1-v_{pq})$ represents the cost of placing p and q in the same segment. Since every edge contributes, whether it is within one segment or across segments, the segmentation cost function is automatically regularized; trivial segmentations such as one segment per node, or all nodes in one segment, typically have high costs, and the best segmentation is somewhere in the middle. Indeed, the algorithm picks the number of segments automatically.

The costs depend only on whether two nodes are in the same segment, and not on the "names" of particular segments, which imposes two constraints on using correlation clustering for segmentation. First, it precludes the use of the invisible segment ξ; therefore, in order to satisfy the rendering constraint, the set of nodes must be restricted to the set of leaf nodes, leaf(N), of the DOM tree. Second, pairwise costs between two nodes p and q must depend only on whether they belong to the same segment:

$$V_{pq}(S(p), S(q)) = \begin{cases} V_{pq} & \text{if } S(p) \neq S(q) \\ 1-v_{pq} & \text{if } S(p) = S(q) \end{cases} \quad (3)$$

Thus, the objective function becomes:

$$\sum_{\substack{p,q \in leaf(N) \\ S(p) \neq S(q)}} V_{pq} + \sum_{\substack{p,q \in leaf \\ S(p) = S(q)}} (1 - V_{pq}) \quad (4)$$

Various known algorithms are available to take advantage of the objective function defined in equation (4), including at least one which can find a segmentation whose cost is within a factor of two of the optimal. Such algorithm is iterative, and at each stage of the iteration, a node p in the current graph is chosen uniformly at random and removed from the graph. A new cluster is created with just p in it. Next, all the nodes q such that $v_{pq \geq 1/2}$ are removed from the graph and placed in the cluster along with p. The process is repeated on the remaining graph. Because this particular algorithm is randomized, several independent trials are repeated and the solution with the least value of the objective function (i.e., closest to the optimal solution) is output as the answer.

To solve the objective function in equation (1) using energy-minimizing graph cuts, the approach is slightly more complicated. The class of energy functions that are "graph-representable" is very broad and there are algorithms to find local minima within a constant factor of the global optimum. Thus, this approach to solving the objective function in equation (1) offers a good balance between expressability and efficiency. In addition, the objective function in equation (1) can be made graph-representable with only a slight constraint on its form, which makes the energy-minimizing graph cuts approach even more attractive.

In light of this, $D_p(\cdot)$ and $V_{pq}(\cdot,\cdot)$ are defined as follows. $V_{pq}$ is defined to be non-zero in only two cases: (1) when nodes p and q are visually close neighbors in the rendering of the webpage, and (2) when p is a parent or child of q. Thus, pairwise relationships encode the information available from the visual rendering and the DOM tree structure, while single-node $D_p$ values (detailed herein) encode node-specific feature information; therefore, all sources of information regarding the webpage, and discussed previously, are taken into account.

Several constraints accompany $D_p$ and $V_{pq}$, some of which come from the particular domain, while others are required for efficient algorithms. The constraints dictated by the domain comprise (it will be appreciated that the invisible segment ξ is considered to be a member of L):

$$D_p(\xi) = \infty \text{ for } p \in leaf(N) \quad (5)$$

$$V_{pq}(\alpha,\beta) = \infty \text{ for parent}(p)=q, \alpha \neq \beta, \beta \neq \xi \quad (6)$$

$$V_{pq}(\alpha,\xi) = V_{pq}(\beta,\xi) \text{ for parent}(p)=q, \alpha \neq \beta, \beta \neq \xi \quad (7)$$

$$V_{pq}(\alpha,\beta) = V_{pq}(\beta,\alpha) \forall \alpha,\beta \in L \quad (8)$$

$$V_{pq}(\alpha,\alpha) = V_{pq}(\beta,\beta) \forall \alpha,\beta \in L \quad (9)$$

$$V_{pq}(\alpha,\beta) = V_{pq}(\gamma,\delta) \alpha \neq \beta, \gamma \neq \delta; p,q \in leaf(N) \quad (10)$$

In other words:

leaf-level nodes can not become invisible;

when parent and child nodes have different segments, the parent must become invisible;

the cost of a parent-child edge is independent of the child's segment if the parent is invisible;

pairwise costs are symmetric;

the cost of belonging to the same segment is independent of the segment; and for leaf nodes, the costs of belonging to different segments is independent of the segments.

The last two constraints follow from the fact that there is no need for an ordering on the set of segments; all that is desired is to know whether two nodes p and q belong to the same segment.

In addition to the above constraints, one other condition must be met before efficient algorithms based on graph cuts can be used, namely graph representability. An energy function is graph-representable if a graph can be constructed such that, for every configuration of its variables, the value of the function is given (up to a constant) by the minimum s-t cut on the graph. An energy function of the form of equation (1) is graph-representable if and only if, for any segments $\alpha, \beta, \gamma \in L$ such that $S(p)=\alpha, S(q)=\beta$ is a feasible state:

$$V_{pq}(\alpha,\beta)+V_{pq}(\gamma,\gamma) \leq V_{pq}(\alpha,\gamma)+V_{pq}(\gamma,\beta) \quad (11)$$

Therefore, an energy function of the form of equation (1), under the domain-specific constraints (5)-(10), is graph-representable if and only if, for all segments $\alpha \neq \beta$, $$V_{pq}(\alpha,\beta) \geq V_{pq}(\alpha,\alpha) \quad (12)$$

In other words, equation (12) states that the cost of merging two nodes to the same segment must always be lower than the cost of breaking them apart, which implies that if there are two nodes that should belong to separate segments, then the pairwise costs $V_{pq}$ can not be used to encode the relationship; the only way to do this is via the $D_p(\cdot)$ term and the chosen L.

The chosen L must take into account the form of $D_p(\cdot)$ and $V_{pq}(\cdot,\cdot)$. Consider a pair of nodes p and q that should be separated in the final segmentation. Instead of pairwise costs, this relationship can be encoded by saying that their single-node costs $D_p(\alpha)$ and $D_q(\alpha)$ are very different from any segment $\alpha$, and $D_p(\cdot)$ and $D_q(\cdot)$ achieve their minima at different segments. Hence, any segmentation that maps them to the same segment will pay a high price in terms of single-node costs. This is encoded by using all internal nodes of the DOM tree as the set L of segments (in addition to the invisible segment $\xi$), and constructing $D_p(\alpha)$ so that it measures the distance between two feature vectors corresponding to the node p and the internal node (i.e., segment in this case) $\alpha$.

Defining L in this way has several advantages. First, it is available before the segmentation algorithm needs to run, and so a pre-defined set of segments can be provided to the algorithm as input. Second, since the segments are themselves nodes, the feature vectors used for the nodes p can immediately be applied to them as well. Third, the segments are "tuned" to the particular webpage being segmented (i.e., for any statically chosen set of segments, there would probably exist many webpages where the segments were a poor fit). Another reason for wanting to separate nodes p and q in the final segmentation is that their feature vectors are very distinct; in this case, they will typically be close to different segments, leading to a segmentation that separates them. Thus, the form of $D_p(\cdot)$ and the chosen segment set act as a cost function trying to separate nodes with distinct properties, while $V_{pq}(\alpha, \beta)$ with $\alpha \neq \beta$ provides a push towards putting them together. $V_{pq}(\alpha, \alpha)$ does not serve any purpose, so it can be set to zero:

$$V_{pq}(\alpha,\alpha)=0 \forall \alpha \in L \quad (13)$$

An algorithm used to solve equation (1) may be based on various algorithms; one of which starts with a trivial segmentation mapping all nodes to an arbitrary visible segment: $S_0: N \to L \setminus \{\xi\}$. The next few steps are done in stages called $\alpha$-expansions; in each $\alpha$-expansion, a segment—$\alpha \in L$— is chosen, and attempts are made to lower the objective function by moving subsets of nodes from their current segments to $\alpha$. The optimal answer for each $\alpha$-expansion can be found using the minimum s-t cut of a graph, whose construction is described below. It is at this stage where the graph-representability of the energy function becomes critical. After the best max-flow cut is found, nodes connected to s have their segments unchanged, while nodes connected to t have their segments changed to $\alpha$. Next, $\alpha$-expansions are iteratively performed for all possible segments $\alpha \in L$ until convergence. This approach produces a solution that is within two factors of the optimum.

As discussed, the algorithm requires that the energy function be graph-representable. To construct such a graph, various factors must be defined. Consider $P^{(s)}$ and $P^{(t)}$ to be two sets of nodes, with each parent node $p \in N \setminus leaf(N)$ being represented once in each of the two sets. The construction starts with an empty graph of nodes $V=leaf(N) \cup P^{(s)} \cup P^{(t)} \cup \{s,t\}$. The graph construction then proceeds in three stages.

Figure 2A:
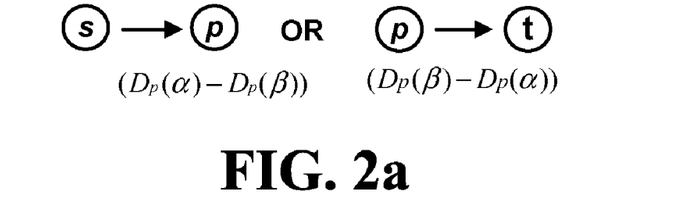
FIGS. 2A-2C illustrate a way in which a graph may be constructed for the energy-minimizing graph cuts formulation.

The first stage handles the single-node costs. Consider a node p, currently assigned a segment $\beta$. If $D_p(\alpha) > D_p(\beta)$, then an edge $s \to p$ is added with weight $(D_p(\alpha) - D_p(\beta))$, otherwise an edge $p \to t$ is added with weight $((D_p(\beta) - D_p(\alpha))$ (see FIG. 2A). This stage of the construction is performed for all nodes $p \in N$.

Figure 2B:
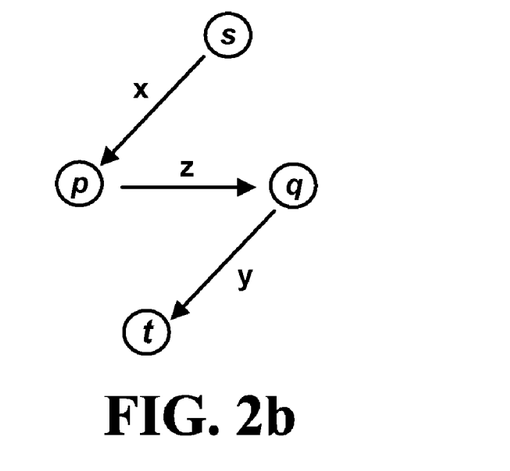

The second stage handles pairwise costs between leaf nodes. Consider a pair of nodes $p,q \in leaf(N)$ that are visually rendered as neighbors, and let their current segments be $\beta$ and $\gamma$ respectively. Then, the following three values are computed:

$$x=V_{pq}(\alpha,\gamma)-V_{pq}(\beta,\gamma)$$

$$y=V_{pq}(\alpha,\alpha)-V_{pq}(\alpha,\gamma)$$

$$z=V_{pq}(\beta,\alpha)+V_{pq}(\alpha,\gamma)-V_{pq}(\beta,\gamma)-V_{pq}(\alpha,\alpha).$$

If $x>0$, the weight of the edge $s \to p$ is increased by $|x|$, else the weight of the edge $p \to t$ is increased by $|x|$. If the edge did not already exist, it is assumed to have existed with weight 0. Similar edges are added for node q with weight y. Finally, edge $p \to q$ is added with weight z ($z>0$ by the graph-representability of the objective). The process is repeated for all ordered pairs $p,q \in leaf(N)$ (see FIG. 2B).

While parent-child pairwise relationships can theoretically be handled just as for pairs of leaf nodes, the graph generated in that fashion will not work. For example, consider one parent DOM node with many children, where the parent and all children are assigned segment $\beta$; the minimum energy would be obtained by having half the children assigned segment $\gamma$ (and the parent assigned $\xi$). This configuration will never be found through iterated $\alpha$-expansions; an $\alpha$-expansion with $\alpha$ set to $\xi$ will fail because the parent can not be simultaneously set to $\xi$ (without which some parent-child pairwise costs would become infinity). Similarly, an $\alpha$-expansion with a set to $\xi$ will fail because all the children will remain assigned to segment $\beta$, and then it is cheaper for the parent to remain in $\beta$ as well.

Figure 2C:
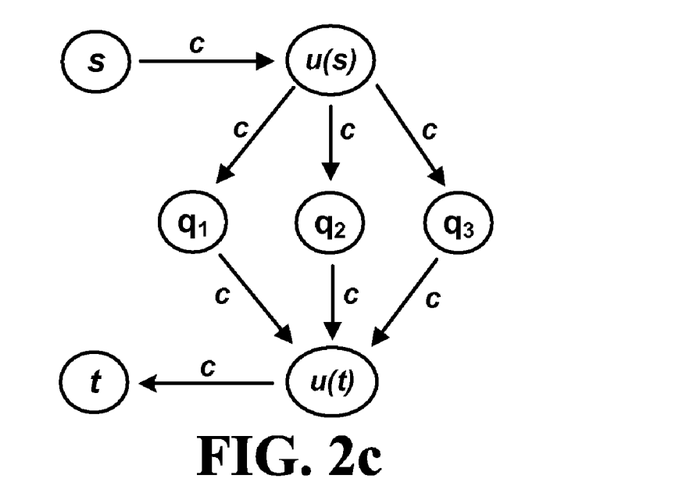

Because of this issue, pairwise parent-child costs must be handled in a different fashion, which constitutes the third stage of the graph construction. Consider a parent node u, and its children $Q=\{q_1, \ldots, q_k\}$. Let $u^{(s)}$ and $u^{(t)}$ be the nodes corresponding to u in the node sets $P^{(s)}$ and $P^{(t)}$ respectively. Let $c=\Sigma_{q \in Q}V_{qu}(S(q),\xi)$ be the total cost incurred for moving parent u to the invisible segment $\xi$. Next, the following edges are added to the graph, all with weight c (see FIG. 2C):

$$s \to u^{(s)}$$

$$u^{(s)} \to q_i (\forall_i \in 1 \ldots k)$$

$$q_i \rightarrow u^{(i)} (\forall_i \in 1 \ldots k)$$

$$u^{(i)} \rightarrow t.$$

Thus far, cost functions have been used to score the quality of segmentations. The cost functions can be decomposed into two principal types of expressions. For the energy-minimizing graph cuts formulation, $D_p(\alpha)$ is used to denote the cost of assigning segment a to a node p, while $V_{pq}(\alpha, \beta)$ is the cost of assigning segment $\alpha$ to node p and segments $\beta$ to node q when p and q are adjacent on a webpage. In the correlation-clustering formulation, these pairwise costs are between all pairs of nodes, irrespective of whether they are adjacent.

These costs can take various forms, and their parameters can be learned from manually labeled data, so as to "train" the algorithms. As discussed, the cost functions compute the costs of placing nodes together or apart in the final segmentation taking into account certain features of nodes. For example, if two nodes are far apart in the visual rendering of the webpage, there should likely be a large cost paid if they are to be placed in the same segment. However, the cost for placing them together should reduce if they share, for example, the same background color. Conversely, even if two nodes are visually adjacent on the webpage, a high cost still may have to be paid to place them in the same segment if they, for example, have text in dramatically different fonts, font sizes, colors, etc. Thus, "cues"—derived from node features—must be defined that can help to compute the costs of placing a pair of nodes together or apart.

Examples of features that may be used, include, in addition to features already detailed herein, "visual" features, such as the segment's position on the rendered webpage, its shape (e.g., aspect ratio, etc.), its background color, types, sizes, and colors of text, etc. Also, content-based features may be utilized as well, such as, for example, average size of sentences, fraction of text within anchors, DOM nodes, tag names, etc. It will be appreciated that the listed features are just examples of the myriad qualities of a webpage that may be used in this regard.

Once feature values have been extracted for nodes and segments, machine learning tools may be used to estimate the weight of each feature when assigning a cost for placing a pair of nodes together or apart. The particular method used for learning depends on the form of the cost function; however, all methods learn the cost functions using the same set of manually labeled webpages, where each DOM node is manually assigned a segment.

Unlike the correlation-clustering formulation, the energy-minimizing graph cuts formulation requires the $D_p(\cdot)$ term (as shown in equation (1)), which computes the cost of assigning DOM node p to a particular segment $\alpha$. The DOM nodes and the segment can both be represented as a vector of features and the cost of assignment computed as the Euclidean distance between the two feature vectors. Given labeled data, the problem can be formulated as learning a Mahalanobis distance metric D such that the node p should be closer to the segment that it has been assigned to than to all other segments.

However, though the labeled data provides a segmentation of the nodes in a webpage, they do not provide the "names" for each of the segments. Thus, an indirect way of learning the Mahalanobis distance metric D may be adopted. While the labeled data does not give the true segment for node p, it does tell indicate which nodes Q are in the same segment as p, and which nodes Q' are not. Consider nodes p and q that are in the same segment according to the labeled data. If the distance metric D'assigns a very small distance between p and q, then it will also make sure that p and q are close to the same segments (i.e., $|D'(p,\alpha)-D'(q,\alpha)| \leq D'(p,q)$ from triangle inequality). Thus, the problem of learning a distance metric D between a node and a segment is cast as that of learning a distance metric D' that tries to ensure that pairs of nodes in the same segment are closer to each other than pairs of nodes across segments. To learn this metric D, a large margin method for learning a Mahalanobis metric using semi-definite programming may be employed. This approach tries to learn distance metrics under which the k nearest neighbors of a data point belong to the same "class," while data points belonging to other classes are separated by a margin. Such a method ensures that the k nearest neighbors to a DOM node (in terms of features) belong to the same segment, while DOM nodes in other segments are separated by at least a fixed distance.

Both formulations (i.e., correlation-clustering and energy-minimizing graphs) require $V_{pq}(\cdot,\cdot)$, which, as explained above, computes the cost of placing a pair of nodes p and q in the same segment. From the manually labeled data, it can be determined whether any pair of nodes should be in the same segment, which means that the parameters for $V_{pq}$ can be learned in a more straightforward manner than for $D_p$. Consider, that for all pairs of nodes that are included in the training set, a "class" is obtained: 1 if the nodes are in the same segment, and 0 if they are not. Consider also that for each such pair of nodes a feature vector is obtained, which represents tendencies of the nodes to occur together or apart. Such a representation turns the problem into the standard learning problem of predicting the class based on the feature vector, which classifier can be learned using, among other methods, logistic regression; this approach has been shown to work well for two-class problems, and it outputs the probability of belonging to one of the classes, which can then be used as the $V_{pq}$ score for a pair of nodes.

It will be appreciated that there may be subtle differences in how the pairs are chosen, depending on whether $V_{pq}$ is being learned for correlation-clustering or for energy-minimizing graph cuts. For example, in the energy-minimizing graph cuts formulation, $V_{pq}$ is defined only over node pairs that have an edge between them (i.e., are adjacent to each other), and so $V_{pq}$ is trained only over those pairs. For correlation-clustering, which operates using a complete graph over the nodes, $V_{pq}$ is trained using all pairs of DOM nodes.

Figure 3:
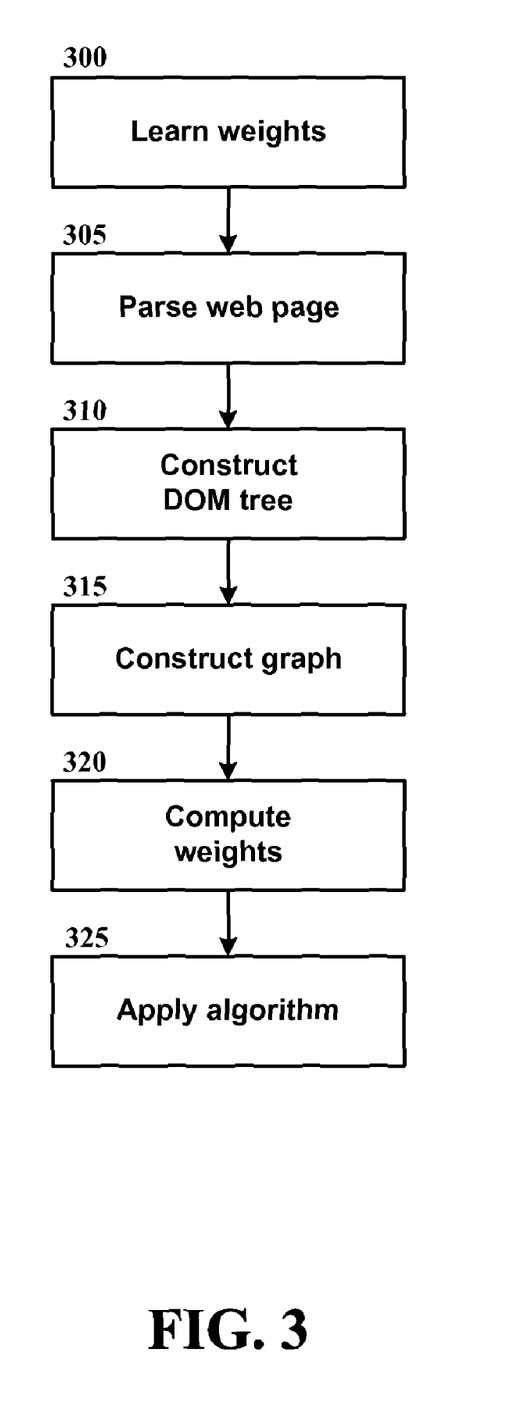
FIG. 3 is a logical flowchart of the general process by which a webpage may be segmented.

The method by which the system may learn the various weights, parse a webpage, and ultimately derive the webpage's segments, is illustrated in FIG. 3. At block 300, the weights are learned, as discussed above. It will be appreciated that the weights usually will have been learned at a time well before the rest of the method runs its course, and that the weights learned will depend on which algorithm is used to solve the objective function.

As illustrated at block 305, the webpage is parsed into its constituent parts (i.e., fragments of HTML and associated text), and at block 310, these parts are used to construct a DOM tree of the webpage. The DOM tree is then converted into a graph, as illustrated by block 315. It will be appreciated that, depending on the formulation used (i.e., either correlation-clustering or energy-minimizing graph cuts), the graph may not need to be complete. As shown at block 320, the weights of the graph are computed. Finally, the objective function is solved according to either the correlation-clustering approach, or the energy-minimizing graph cuts approach.

As mentioned briefly above, the described webpage segmentation methods may prove useful in various applications, including the detection of duplicate webpages, which, if not checked, can use up valuable search engine resources and deteriorate a user's search experience.

Currently, most duplicate detection algorithms rely on the concept of "shingles," which are generally extracted from a webpage by moving a fixed-size window over the text of the webpage. The shingles with the smallest N hash values are then stored as the "signature" of the webpage, and two webpages may be considered near-duplicates if their signatures share shingles.

Typical shingling algorithms consider all content on a webpage to be equally important (i.e., shingles are equally likely to come from any part of the webpage), which can be problematic because a significant fraction of the content is noisy, and generally does not represent the functionality of the webpage (e.g., navigation bars, copyright notices, etc.) and should not be used to compare whether two webpages are duplicates. Moreover, such noisy segments often manifest themselves by being repeated across several pages of a website, which might cause a shingling approach to consider two distinct webpages from the same website to be duplicates if the shingles come from the noisy content. Similarly, false-negatives might occur if two, truly duplicate webpages exist on different websites with different noisy content.

The webpage segmentation algorithms as described can be employed in duplicate detection processes in a variety of ways, each of which can improve the accuracy of the duplicate detection algorithms. One such method involves using the webpage segmentation algorithm as a pre-processing step to shingling the webpages; in one implementation, the webpage segmentation algorithm may be used to label each segment as either noisy or informative (i.e., likely not noisy), and then all of the segments labeled as informative may be used for shingling (i.e., the noisy segments may be disregarded). In another implementation, the duplication detection algorithm may use the largest segments found by the webpage segmentation algorithm for shingling (under the assumption that the largest segment typically contains the most informative content).

The sequence and numbering of blocks depicted in FIG. 3 is not intended to imply an order of operations to the exclusion of other possibilities. Those of skill in the art will appreciate that the foregoing systems and methods are susceptible of various modifications and alterations.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of segmenting a webpage into a plurality of segments using a weighted graph comprising a plurality of graph nodes, said method comprising:
    parsing the webpage into a plurality of Document Object Model (DOM) tree nodes;
    constructing a graph, wherein the plurality of graph nodes are associated with at least one of the plurality of DOM tree nodes;
    creating the weighted graph by assigning a plurality of weights to the graph, wherein the plurality of weights are informed by values learned from a set of labeled webpages;
    minimizing an objective function on the weighted graph; and
    responsive to said minimizing, segmenting the webpage into the plurality of segments.

2. The method of claim 1 wherein correlation clustering is used to minimize the objective function, and wherein the objective function comprises:

$$\sum_{\substack{p,q \in leaf(N) \\ S(p) \neq S(q)}} V_{pq} + \sum_{\substack{p,q \in leaf \\ S(p) = S(q)}} (1 - V_{pq}),$$

wherein:
    N is the plurality of DOM tree nodes;
    p and q are graph nodes in the weighted graph;
    $V_{pq}$ is a cost of assigning a different one of the plurality of segments to each of the end points of an edge (p,q); and
    S(x) is a segmentation function that assigns one of the plurality of segments to node x.

3. The method of claim 2 wherein the values learned from the set of labeled webpages are learned by:
    determining, for each of a plurality of node pairs existing in the set of labeled webpages:
        whether the two nodes in the node pair are in the same segment; and
        a feature vector representing the tendency of the two nodes in the node pair to exist in the same segment;
    and based on the feature vector, generating a probability of whether the two nodes in the node pair are in the same segment.

4. The method of claim 1 wherein:
    energy-minimizing graph cuts are used to minimize the objective function;
    the plurality of segments comprises a subset L of the DOM tree nodes which are internal, and an invisible segment; and
    wherein the objective function comprises:

$$\sum_{p \in N} D_p(S(p)) + \sum_{p,q \in N} V_{pq}(S(p), S(q)),$$

wherein:
    N is the plurality of DOM tree nodes;
    p and q are graph nodes in the weighted graph;
    $V_{pq}: L \times L \to R^{\geq 0}$ is a cost of assigning a different one of the plurality of segments to each of the end points of an edge (p,q);
    $D_p: L \to R^{\geq 0}$ is a cost of assigning one of the plurality of segments to p; and
    S(x) is a segmentation function that assigns one of the plurality of segments to node x.

5. The method of claim 4, further comprising constraining the objective function, wherein the constraints comprise:

$D_p(\xi) = \infty$ for $p \in leaf(N)$;

$V_{pq}(\alpha, \beta) = \infty$ for parent(p)=q, $\alpha \neq \beta, \beta \neq \xi$;

$V_{pq}(\alpha, \xi) = V_{pq}(\beta, \xi)$ for parent(p)=q, $\alpha \neq \beta, \beta \neq \xi$;

$V_{pq}(\alpha, \beta) = V_{pq}(\beta, \alpha) \forall \alpha, \beta \in L$;

$V_{pq}(\alpha, \alpha) = V_{pq}(\beta, \beta) \forall \alpha, \beta \in L$;

$V_{pq}(\alpha, \beta) = V_{pq}(\gamma, \delta) \alpha \neq \beta, \gamma \neq \delta$; p,q∈leaf(N); and $V_{pq}(\alpha, \beta) \geq V_{pq}(\alpha, \alpha), \alpha \neq \beta$;

wherein:
ξ is an invisible segment; and
α,β,γ,δ are each one of the plurality of segments.

6. The method of claim 4 wherein the values learned from the set of labeled webpages comprise edge weights, which are learned by:
determining, for each of a plurality of adjacent node pairs existing in the set of labeled webpages:
whether the two nodes in the adjacent node pair are in the same segment; and
a feature vector representing the tendency of the two nodes in the adjacent node pair to exist in the same segment;
and based on the feature vector, generating a probability of whether the two nodes in the adjacent node pair are in the same segment.

7. The method of claim 4 wherein the values learned from the set of labeled webpages comprise node weights, which represent the cost of assigning one of a plurality of segments in the set of labeled webpages to one of a plurality of DOM tree nodes in the set of labeled webpages, wherein the node weights are learned by:
representing each of the plurality of DOM tree nodes and segments in the set of labeled webpages as a feature vector; and
for each of the plurality of DOM tree nodes, determining a Mahalanobis distance metric between the DOM tree node and its assigned segment, while trying to ensure that pairs of nodes in the same segment, as defined by the labeled webpages, are closer to each other than pairs of nodes in different segments.

8. The method of claim 1 wherein the plurality of segments is applied to one of the detection of duplicate webpages or the rendering of the webpage on a device whose screen size is constrained.

9. A method of segmenting a webpage into a plurality of segments by constructing a weighted graph from a webpage's DOM tree, wherein the weighted graph is amenable to an energy-minimizing graph cuts formulation, said method comprising:
defining two sets of nodes, $P^{(s)}$ and $P^{(t)}$, wherein each parent node in a set of nodes N is represented once in each of the two sets of nodes; and
modifying an empty graph of nodes, $V=\text{leaf}(N) \cup P^{(s)} \cup P^{(t)} \cup \{s,t\}$, by performing the following:
generating a cost for each node;
generating a pairwise cost for each pair of nodes, wherein the two nodes are leaf nodes;
generating a pairwise cost for each pair of nodes, wherein the two nodes exist in a parent-child relationship, thereby constructing the weighted graph, and
segmenting the webpage into a plurality of segments by minimizing an objective function on the weighted graph.

10. The method of claim 9, wherein said generating a cost for each node comprises:
determining whether $D_p(\alpha) > D_p(\beta)$, wherein $D_x(y)$ is the cost of assigning a segment y, to a node x; and
based on said determination, adding to the graph:
(i) an edge s→p with weight $(D_p(\alpha) - D_p(\beta))$; or
(ii) an edge p→t with weight $((D_p(\beta) - D_p(\alpha))$.

11. The method of claim 9, wherein said generating a pairwise cost for each pair of leaf nodes, p,q∈leaf(N), comprises:
computing the following values x, y, and z:

$$x = V_{pq}(\alpha,\gamma) - V_{pq}(\beta,\gamma)$$

$$y = V_{pq}(\alpha,\alpha) - V_{pq}(\alpha,\gamma)$$

$$z = V_{pq}(\beta,\alpha) + V_{pq}(\alpha,\gamma) - V_{pq}(\beta,\gamma) - V_{pq}(\alpha,\alpha),$$

wherein $V_{pq}(x,y)$ is a cost of assigning a segment x to node p and a segment y to node q;
if x>0, increasing the weight of the edge s→p by |x|, else increasing the weight of the edge p→t by |x|, and if the edge did not already exist, assuming it existed with weight 0;
if y>0, increasing the weight of the edge s→q by |y|, else increasing the weight of the edge q→t by |y|, and if the edge did not already exist, assuming it existed with weight 0; and
adding edge p→q with weight z.

12. The method of claim 9, wherein said generating a cost for each pair of parent-child nodes comprises:
defining a parent node u with child nodes $Q=\{q_1, \ldots, q_k\}$, where nodes $u^{(s)}$ and $u^{(t)}$ correspond to u in the node sets $P^{(s)}$ and $P^{(t)}$;
generating, as a weight c, the total cost of moving u to an invisible segment ξ; and
adding edge $s \to u^{(s)}$ to the graph, with the weight c;
adding edge $u^{(s)} \to q_i (\forall_i \in 1 \ldots k)$ to the graph, with the weight c;
adding edge $q_s \to u^{(t)} (\forall_i \in 1 \ldots k)$ to the graph, with the weight c; and
adding edge $u^{(t)} \to t$ to the graph, with the weight c.

13. The method of claim 12 wherein the weight c is generated according to the following equation:

$$c = \Sigma_{q \in Q} V_{qu}(S(q),\xi),$$

wherein:
$V_{pq}(x,y)$ is a cost of assigning a segment x to node p and a segment y to node q; and
S(q) is a segmentation function that assigns a segment to node q.

14. A method of segmenting a webpage into a plurality of segments using a weighted graph comprising a plurality of graph nodes, said method comprising:
parsing the webpage into a plurality of Document Object Model (DOM) tree nodes;
constructing a graph, wherein the plurality of graph nodes are associated with at least one of the plurality of DOM tree nodes;
creating the weighted graph by assigning a plurality of weights to the graph, wherein the plurality of weights are informed by values learned from a set of labeled webpages; and
segmenting the webpage into the plurality of segments by applying a heuristics-based algorithm to the weighted graph.

15. A method of segmenting a webpage into a plurality of segments using a weighted graph comprising a plurality of graph nodes, said method comprising:
parsing the webpage into a plurality of Document Object Model (DOM) tree nodes;
constructing a graph, wherein the plurality of graph nodes are associated with at least one of the plurality of DOM tree nodes;

creating the weighted graph by assigning a plurality of weights to the graph, wherein the plurality of weights are informed by values learned from a set of labeled webpages; and segmenting the webpage into the plurality of segments by applying a rules-based algorithm to the weighted graph.

* * * * *